Figures 1, 2:
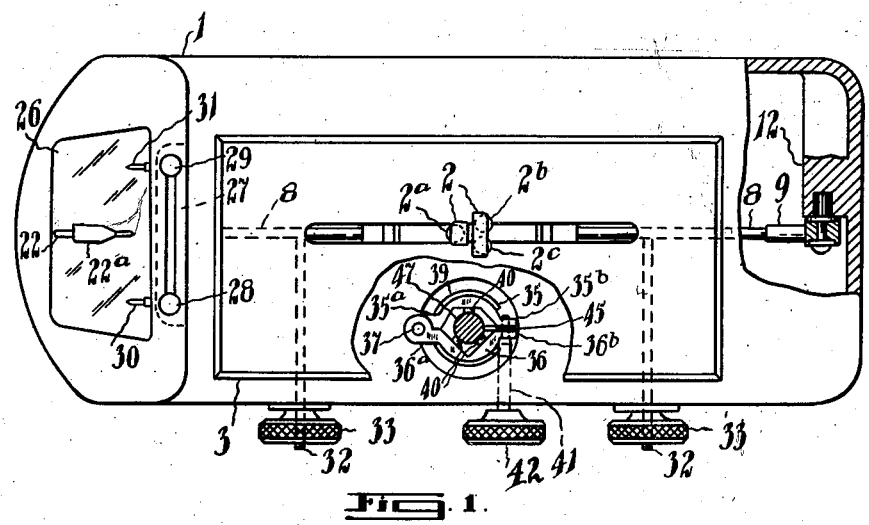

June 12, 1945.  P. B. SIRVENT  2,378,334
COMPARATOR GAUGE
Filed Sept. 29, 1943  2 Sheets-Sheet 1

Inventor
P. B. Sirvent
By Gareth G. Maybee
ATTY.

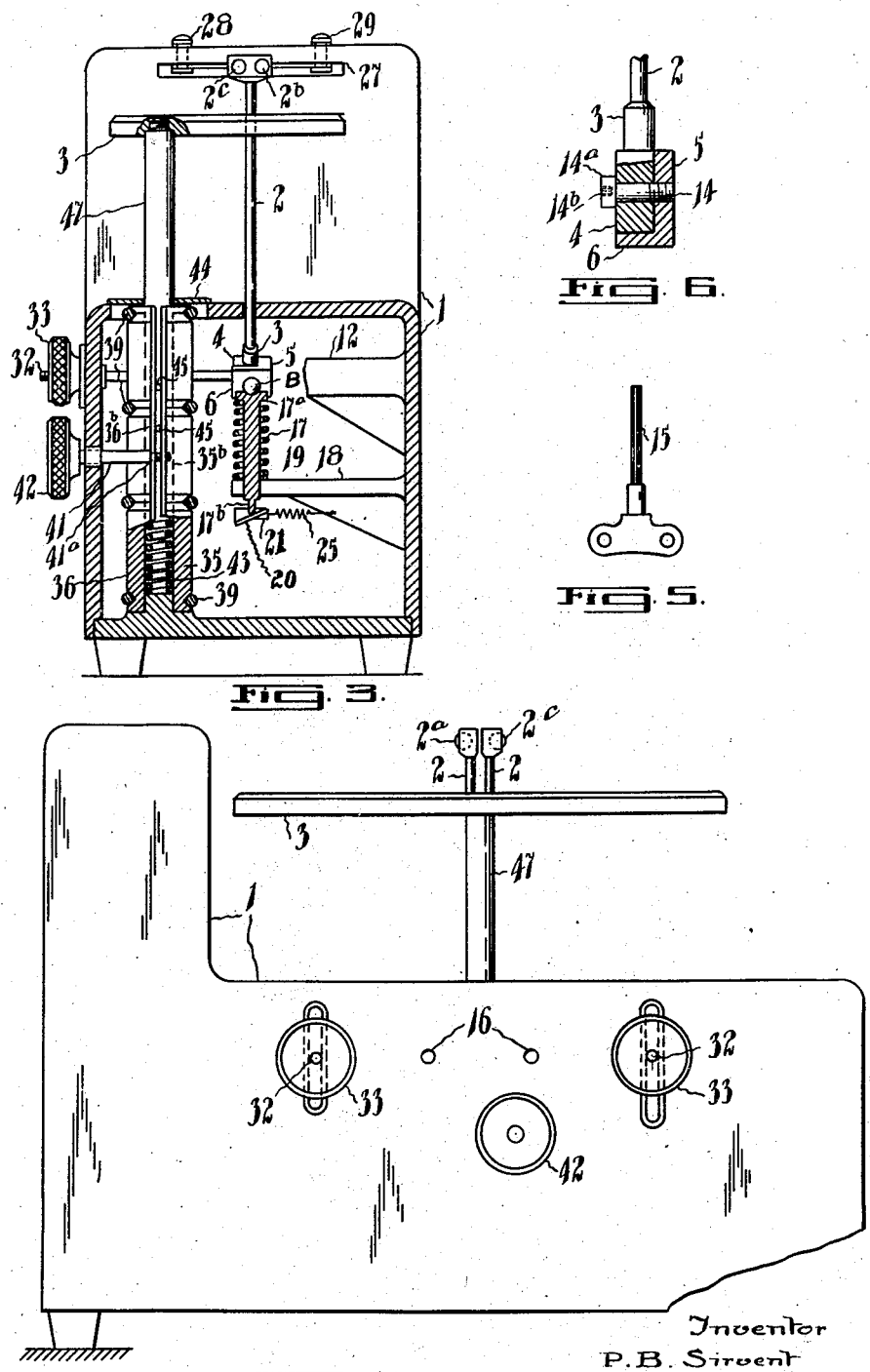

Patented June 12, 1945

2,378,334

UNITED STATES PATENT OFFICE 2,378,334

COMPARATOR GAUGE

Philip Botaya Sirvent, Toronto, Ontario, Canada

Application September 29, 1943, Serial No. 504,227

12 Claims. (Cl. 33—148)

This invention relates to gauges, particularly to comparator gauges for checking inside diameters or bores of small objects.

The purpose of the invention is to devise a gauge which will be handy, accurate, and cheap and easy to make. A further purpose is to devise a gauge which will support as well as gauge the object. A still further purpose is to provide means for supporting the object which can be accurately positioned relative to the gauge.

These and other purposes are achieved by means of the construction hereinafter described by way of example, and illustrated in the annexed drawings, in which Figure 1 is a plan view of the gauge, partly broken away.

Figure 2 a longitudinal section of the gauge on the line 2—2 in Figure 1;

Figure 3 a vertical section on the line 3—3 in Figure 2;

Figure 4 a side elevation of the gauge on a reduced scale showing the supporting platform in a lowered position in full lines and in a raised position in dotted lines;

Figure 5 a side elevation of the adjusting key; and

Figure 6 a cross section on an enlarged scale on the line 6—6 in Figure 1.

In the drawings like numerals of reference indicate corresponding parts in the different figures.

The gauge is mounted in the frame 1 which is substantially L-shaped in cross section and which encloses the main operating parts of the gauge. Two calipers or measuring fingers 2 extend upwardly and substantially parallel and through a slot in the top of the frame 1, one of said measuring fingers being provided with a single ball surface 2ª for engaging the inside or bore of the object to be measured, and the other measuring finger being provided with two such surfaces 2ᵇ and 2ᶜ arranged side by side. The arms 2 pass up through a slot in a support or platform 3 for the object 46 which is being checked, and the platform 3 is mounted on a post 47 which is vertically adjustable in a manner hereinafter described.

The measuring fingers 2, 2 are turned outwardly at about an angle of 45° at their lower ends and fit into bosses 3, 3 on drums 4, 4 which are secured to drums 5, 5 having flanges 6, 6 which extend around the drums for about one half of their periphery and tangentially outwardly and upwardly therefrom, bearings 6ª, 6ª being inserted in the tangential portion of the said flanges 6, 6, said bearings engaging a ball B (see Figure 2).

The tangential portions of the flanges 6, 6 are substantially at right angles to one another and on a plane parallel to the axis of the outturned lower ends of the measuring arms 2, 2, and the bearings 7, 7 engage the surface of the ball B at points approximately 45° apart, which position will vary somewhat as will hereinafter appear.

The flanges 6, 6 are provided with bosses 7, 7 to which are secured arms 8, 8 which in turn are secured to bosses 9, 9 on sleeves 10, 10 which are rotatably mounted on stub shafts 11, 11 secured to brackets 12, 12 which extend out from the frame 1. The sleeves 10, 10 are held on the shafts 11, 11 by means of what are commonly called "circlip" locks 13, 13 that is to say circular spring metal devices which snap into grooves in the ends of the shafts.

It will be seen that the assembly already described will swing up and down pivoting on the shafts 11, 11 so that the measuring fingers 2, 2 will move to and from one another. Since the device is used for checking the width or diameter of various objects, means is provided for setting the distance apart of the measuring fingers at any desired distance within a predetermined range, such means comprising a bolt 14 extending through the drum 4 and screwing into the drum 5, said bolt having a head 14ª engaging the outer surface of the drum 4 and a countersunk multi-sided recess 14ᵇ (see Figure 6). To adjust the position of the measuring fingers 2 relative to the arms 8, the key 15 is inserted through openings 16 in the frame 1 (see Figure 4), and into the recess 14ᵇ and turned to loosen the bolt 14, so that the fingers 2 can be moved relative to the arm 8 to desired positions, and then the bolt tightened up and the key removed.

The measuring fingers 2 are supported and normally pressed so that they tend to spread apart by means of the pin 17 which is slidably mounted in a bracket 18 and is provided with a head 17ª against which a coil spring 19, which surrounds the pin, bears at one end, the other end of the spring bearing against the bracket 18. The head 17ª of the pin 17 is provided with a recess to receive the ball bearing B. The bracket 18 extends outwardly from the frame 1. The lower end of the pin is provided with a projection 17ᵇ having a rounded end adapted to engage the sloping surface 20 of the pivoted arm 21 which supports the indicating finger 22. The arm 21 is pivoted to the underside of the bracket 18 by means of a screw 23 which passes through a collar 24 and screws into a bushing in the bracket 18.

A coil spring 25 is secured to the arm 21 and to the supporting web of the bracket 18 to the left of the crew 23 in Figure 2, exerting a pull on the arm which pulls the sloping plate 20 into contact with the rounded end 17b of the pin 17. A raising and lowering of the pin 17 will thus tend to cause the arm 21 and hence the indicating finger 22 to swing from side to side according to the movement of the pin 17. Inasmuch as the length of the arm to the right of the pivot screw 23 is much shorter than the length of the arm and indicating finger to the left of said screw, the movement as shown on the indicating finger which is provided with a pointer 22a, is magnified very considerably so that movement of the pin over a very small fraction of an inch will be clearly shown by the pointer 22a. The ratio of movement of the pointer 22a to the contacts surfaces 2a, 2a of the measuring arms 2 is approximately 150 to 1 in the construction illustrated. The indicating finger 22 is substantially L-shaped and extends up in the frame to a point beneath the opening 26 which may be covered by a sheet of transparent material such as glass. Mounted on knobs 28 and 29 which slide in a slot 27 in the frame 1 are two measuring pointers 30 and 31 which can be set as hereinafter described, to indicate the outside limits of movement of the indicating pointer 22a.

To retain the arms 8, 8 in position during adjustment as hereinafter described, shafts 32, 32 extend outwardly through vertical slots in the front of the casing 1. Knobs 33, 33 are screwed on the ends of the shafts 32, 32 and are adapted to be tightened to clamp the shafts to the casing thus securing the arms in a predetermined position.

The operation of the device as so far described is as follows: First the arms 8, 8 are moved down against the pressure of the spring 19 until the indicating pointer 22a is approximately centrally located in the opening 26. The knobs 33, 33 are then tightened up holding the arms 8, 8 in this position. The bolts 14 are then loosened by means of the key 15 so that the arms 2, 2 may be swung relatively to one another. An object 46 of correct or mean diameter, such as a bushing, shown in dotted lines in Figure 2 is placed on the platform 5 with the ends of the measuring fingers 2, 2 within the bore of the object and bearing against the sides thereof. The bolts 14, 14 may then be tightened and the knobs 33, 33 loosened. Then an object having the maximum permitted diameter is placed over the fingers 2, 2. The indicating pointer 22a will swing to one side of the opening 26 and the measuring pointer 31 moved to a position opposite it. After this has been done another sample object 46 having the minimum permitted diameter is placed over the measuring fingers 2, 2 and this presses the said fingers together causing the pin 17 to be pushed down to engagement with the sloping part 20 thus swinging the indicating finger 22, and thus the pointer 22a in the opposite direction. The pointer 30 is then placed opposite the pointer 22a. Thereafter, various objects are tested by being placed over the measuring fingers or calipers 2, and if the indicating pointer 22a swings past either the measuring pointer 30 or 31 in either direction the diameter of the object being checked will be known to be beyond the permitted tolerance.

It will be seen that the gauge is automatically self-compensating for wear on the engaging surfaces 2a or the bearings 7 and 8. When contact surfaces have become worn, it is necessary only to reset the measuring fingers in the same manner as they were originally set. This may be done as often as desired if the gauge is being used to check identical bores in quantities.

An important feature of this invention lies in the fact that integral with the device is an adjustable supporting platform 3, already mentioned. It is important that this platform be perfectly steady and free from motion at all times, and also that it be accurately adjustable, with means for holding it in any desired adjusted position.

The platform which is provided with a longitudinal central slot for movement of the measuring fingers 2, 2 is supported from one side by means of a post 47 (see Figures 3 and 4). This post passes down into the frame and is vertically slidable in bearing members which are formed of a fixed part 35 and a movable part 36 which are hinged together along one side by means of hinge members 36a and 35a and a bolt 37 passing through said hinge members from top to bottom. A plurality of transverse grooves 38, 38, 38, 38 are provided in the bearing members and C-shaped spring clips 39, 39, 39, 39, in said grooves press the parts together to firmly embrace the post 47. Preferably three or more bearing surfaces 40 are inset in the bearing members 35, 36 and engage the post 47.

Each bearing member has an outwardly extending flange 35b and 36b on its free edge and the screw 41 passes through the flange 36b and is screwed into the flange 35b intermediate the ends thereof. A shoulder 41a bears on the flange 36b to clamp the flanges together when the screw is tightened up. The shaft of the screw 41 passes out through a hole in the frame 1 and a handle 42 is provided for turning the screw. By turning the handle to the right, the two bearing members 35 and 36 are clamped together so firmly that the post 47 cannot slide vertically between them. By loosening the screw, vertical adjustment of the post may be obtained although the spring clips 39 will maintain the bearings in close contact with the post at all times.

Preferably below the post 47 and between the bearing members 35 and 36 is mounted a compression spring 43 which bears against the bottom of the post 47 and tends to force it upwardly. This counteracts the weight of the post 47 and the platform 3 and provides a buffer. A table shock ring 44 surrounds the post 47 above the frame 1.

To prevent twisting of the post 47, pins 45, 45 are secured in said post extending outwardly at right angles thereto and into the space between the flanges 35b and 36b.

It will thus be seen that I have provided a simple construction of comparator gauge and supporting table therefor which will give accurate comparative measurements over a wide range.

By calibrating the indicating opening 26 actual measurements may be obtained. The gauge illustrated is intended to measure variations of as little as .0001" in holes of from .7500" to 7.000" in diameter. The device is particularly adapted for use at the machine, where production parts which are not entirely free from oil may be checked without damaging the gauge. The three point contact will check the diameter of any part of the bore, and will detect out of round, and such irregularities as front taper, back taper, bellmouth, and barrel shape.

It is thought that the construction and use of the invention will be apparent from the above description of the various parts and their purpose. It is to be understood that the form of my invention herewith shown and described, is to be taken as a preferred example of the same, and that various changes in the shape, size and arrangement of parts may be resorted to, without departing from the spirit of my invention, or the scope of the subjoined claims.

What I claim as my invention is:

1. In a gauge, the combination of a frame; at least two measuring fingers having surfaces at their outer ends for contacting the object to be measured, at least one of said measuring fingers being swingable to and from the other finger; an arm pivoted at one end to the frame and extending at an angle to the said swingable measuring finger, the inner end of said finger being secured to the other end of the arm; means for adjusting the angle between the measuring finger and the arm; an indicating finger; and means operated by the swinging movement of the measuring finger for moving the indicating finger.

2. In a gauge, the combination of a frame; at least two measuring fingers having surfaces at their outer ends for contacting the object to be measured, at least one of said measuring fingers being swingable to and from the other finger; an arm pivoted at one end to the frame and extending at an angle to the said swingable measuring finger, the inner end of said finger being secured to the other end of the arm; means for adjusting the angle between the measuring finger and the arm; a pin mounted on the frame for longitudinal sliding movement, said pin being movable in one direction by the swinging movement of the measuring finger; means urging the pin in the other direction; and an indicating finger swingably mounted on the frame, said pin being adapted to engage said finger to swing the same.

3. In a gauge, the combination of a frame; at least two measuring fingers having surfaces at their outer ends for contacting the object to be measured, at least one of said measuring fingers being swingable to and from the other finger; an arm pivoted at one end to the frame and extending at an angle to the said swingable measuring finger, the inner end of said finger being secured to the other end of the arm; means for adjusting the angle between the measuring finger and the arm; a pin mounted on the frame for longitudinal sliding movement; a bearing on said arm engaging a bearing on one end of said pin, whereby swinging movement of the arm will move the pin in one direction; a spring urging the pin in the other direction; and an indicating finger movable by the pin.

4. In a gauge, the combination of a frame; at least two measuring fingers having surfaces at their outer ends for contacting the object to be measured, said fingers being swingable to and from each other; arms pivoted at one end on the frame and extending at an angle to the swingable measuring finger, the inner ends of the measuring fingers being secured to the other ends of the arms; a pin mounted on the frame for longitudinal sliding movement, the ends of said arms remote from their pivot points bearing against an end of the pin; a spring tending to move said pin to lift the arms and spread the measuring fingers; and an indicating finger operated by the movement of the pin.

5. In a gauge, the combination of a frame; at least two measuring fingers having surfaces at their outer ends for contacting the object to be measured, said fingers being swingable to and from each other; arms pivoted at one end on the frame and extending at an angle to the swingable measuring finger, the inner ends of the measuring fingers being secured to the other ends of the arms; means for adjusting the angles between the fingers and the arms; a pin mounted on the frame for longitudinal sliding movement, the ends of said arms remote from their pivot points bearing against an end of the pin; a spring tending to move said pin to lift the arms and spread the measuring fingers; and an indicating finger operated by the movement of the pin.

6. In a gauge, the combination of a frame; at least two measuring fingers having surfaces at their outer ends for contacting the object to be measured, at least one of said measuring fingers being swingable to and from the other finger; an arm pivoted at one end to the frame and extending at an angle to the said swingable measuring finger, the inner end of said finger being secured to the other end of the arm; means for adjusting the angle between the measuring finger and the arm; a pin mounted on the frame for longitudinal sliding movement, said pin being movable in one direction by the swinging movement of the measuring finger; means urging the pin in the other direction; and an indicating finger swingably mounted on the frame; and a sloping surface on one end of the indicating finger engaged by the pin, whereby longitudinal movement of the pin will cause swinging movement of the indicating finger.

7. In a gauge, the combination of a frame; at least two measuring fingers having surfaces at their outer ends for contacting the object to be measured; a platform for supporting the object to be measured; a post for supporting the platform in the desired position relative to the measuring fingers; bearings in which the post is vertically movable, said bearings being secured to the frame and formed in two parts which are spring pressed together to maintain the bearings in close contact with the post; and means for releasably securing the post in various vertical positions.

8. In a gauge, the combination of a frame; at least two measuring fingers having surfaces at their outer ends for contacting the object to be measured; a platform for supporting the object to be measured; a vertically movable post for supporting the platform in the desired position relative to the measuring fingers; hinged members mounted on the frame having bearing surfaces for the post; and spring means tending to close the hinged members against the post.

9. In a gauge, the combination of a frame; at least two measuring fingers having surfaces at their outer ends for contacting the object to be measured; a platform for supporting the object to be measured; a vertically movable post for supporting the platform in the desired position relative to the measuring fingers; hinged members mounted on the frame having bearing surfaces for the post; spring means tending to close the hinged members against the post; and means for clamping the hinged members in contact with the post to secure the post in position.

10. In a gauge, the combination of a frame; at least two measuring fingers having surfaces at their outer ends for contacting the object to be measured; a platform for supporting the object to be measured; a vertically movable post for supporting the platform in the desired position relative to the measuring fingers; a member mounted on the frame having a bearing surface for the post; another similar bearing member complementary to the first bearing member; a spring clip extending around the bearing members and tending to close them against the post; and means for clamping the members in contact with the post to secure the post in position.

11. In a gauge, the combination of a frame; at least two measuring fingers having surfaces at their outer ends for contacting the object to be measured; a platform for supporting the object to be measured; a vertically movable post for supporting the platform in the desired position relative to the measuring fingers; means for releasably securing the post in various vertical positions; and a spring tending to force the post upward to a predetermined position of maximum height.

12. In a gauge, the combination of a frame; at least two measuring fingers having surfaces at their outer ends for contacting the object to be measured; a platform for supporting the object to be measured; a vertically movable post for supporting the platform in the desired position relative to the measuring fingers; hinged members mounted on the frame having bearing surfaces for the post; spring means tending to close the hinged members against the post; a longitudinal slot between said hinged members; and a pin extending out from the post and into said slot to prevent rotation of the post.

PHILIP BOTAYA SIRVENT.